United States Patent [19]

Felgentreu et al.

[11] Patent Number: 4,900,176

[45] Date of Patent: Feb. 13, 1990

[54] PIVOTABLE PEN TIP

[75] Inventors: Peter Felgentreu, Hamburg-Harburg; Klaus-Joachim Meinert, Itzehoe, both of Fed. Rep. of Germany

[73] Assignee: Koh-I-Noor Rapidograph, Inc., Bloomsbury, N.J.

[21] Appl. No.: 236,765

[22] Filed: Aug. 26, 1988

[30] Foreign Application Priority Data

Aug. 27, 1987 [DE] Fed. Rep. of Germany ....... 3728564

[51] Int. Cl.[4] .......................... B43K 1/06; B43K 1/10; G01D 15/16

[52] U.S. Cl. ............................... 401/258; 346/140 A; 401/214; 401/259; 401/54

[58] Field of Search ............... 401/258, 259, 260, 214, 401/54; 346/140 A

[56] References Cited

U.S. PATENT DOCUMENTS

| | | | |
|---|---|---|---|
| 250,802 | 12/1881 | Gard | 401/259 |
| 2,033,794 | 3/1936 | Walter | 401/258 |
| 2,136,967 | 11/1938 | Donner et al. | 401/258 |
| 4,271,982 | 6/1981 | Niksich et al. | 401/260 X |

FOREIGN PATENT DOCUMENTS

| | | | |
|---|---|---|---|
| 193273 | 1/1957 | Austria | 401/214 |
| 1203641 | 10/1965 | Fed. Rep. of Germany . | |
| 1911951 | 9/1970 | Fed. Rep. of Germany . | |
| 3009169 | 10/1981 | Fed. Rep. of Germany . | |
| 3009100 | 5/1982 | Fed. Rep. of Germany . | |
| 8519712 | 12/1986 | Fed. Rep. of Germany . | |
| 3714757 | 2/1988 | Fed. Rep. of Germany . | |
| 606583 | 6/1926 | France | 401/54 |
| 446795 | 3/1949 | Italy | 401/214 |
| 178251 | 5/1936 | Switzerland | 401/258 |
| 1299830 | 3/1987 | U.S.S.R. | 401/258 |

*Primary Examiner*—Steven A. Bratlie

*Attorney, Agent, or Firm*—Fitzpatrick, Cella, Harper & Scinto

[57] ABSTRACT

In a tube pen tip with a writing tube (3) supported in the front end of a pen body (1) where the writing tube (3) is pivotable against a resilient pressure means in a limited way in all directions around a point located on the writing tube center axis (11) and inside of the pen body (1). The rear end of the writing tube (3) is movably braced against axial displacement by a guide surface (6) that is centrosymmetrically located in the pen body (1) on a central axis (11) of the unpivoted writing tube (3).

13 Claims, 1 Drawing Sheet

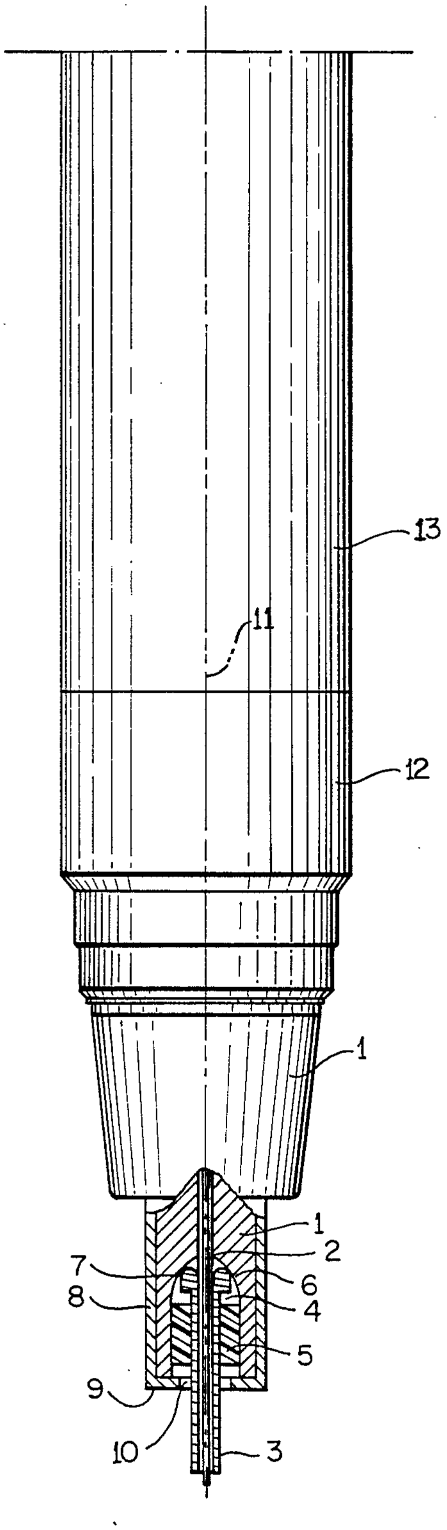
13
11
12
1
1
2
7
6
8
4
5
9
10
3

PIVOTABLE PEN TIP

BACKGROUND OF THE INVENTION

1. Field of the Invention

The invention relates to a writing tube pen tip having a pen body comprising a tube pen in its tip and a drop weight body, in the front section of which is disposed a cleaning wire extending into the tube pen.

2. Brief Description of the Prior Art

Such writing tube pen tips are known in various embodiments (e.g., German Patent 1 911 951 and German published application DE-OS 30 09 100). Generally the rear section of the pen body forms an inner bore, into which the drop weight is inserted. The drop weight is limited in its back and forth movement so that the cleaning wire, which in its position of rest slightly protrudes over the front end of the tube pen, can shift axially backwards when the front end of the tube pen is placed on a writing or drawing surface. This motion causes the front end of the writing tube to come into flat contact with the writing surface.

The back of the inner bore is connected with a writing fluid storage chamber, such as an interchangeable ink cartridge, and a pressure equalization chamber is disposed between the exterior wall of the pen body and a covering tubular body. The pressure equalization chamber is connected with the inner bore on the one hand and with the ambient air on the other.

Writing tube tips of this type are used as parts of tube pens which are employed as manual drawing devices as well as with plotters, where a plotter pen is inserted into a holder that is moved across a drawing or writing surface, in a controlled manner.

As mentioned above, the front end of a writing tube is in flat contact with a writing or drawing surface during operation of the known tube pen tips. This fact limits the drawing speed of such tube pen tips for the reason that above a certain drawing speed it is impossible to apply a sufficient amount of drawing fluid to the surface from a writing tube that is in flat contact with the writing or drawing surface.

OBJECT AND SUMMARY OF THE INVENTION

It is an object of the invention to improve a writing tube pen tip in such a way that considerably higher drawing speeds become possible.

To attain this object a writing tube pen tip of the type mentioned above is designed by means of the invention such that the writing tube is pivotable against a resilient pressure in a limited way in all directions around a point located on its center axis and inside the pen body. Further, the rear end of the writing tube is movably braced against axial displacement in relation to a guide surface provided centrosymmetrically in the pen body on a central axis of the unpivoted writing tube.

Therefore, in a tube pen tip according to the invention, the tube pen is pivotably supported in the pen body around a point located on its center axis, pivoting taking place against the force of a spring which normally maintains the writing tube in an unpivoted position. The rear end of the writing tube pen is braced against a centrosymetrically disposed guide surface and is thus secure against axial displacement into the pen body.

When the front end of the writing tube comes into contact with the writing or drawing surface and is being moved in relation to it, the writing tube is slightly pivoted against a resilient pressure means around a point located on its center axis by the frictional resistance occurring at the writing tube front end. Accordingly, the part of the writing tube tip front end facing towards the rear (with reference to the direction of movement), is moved slightly above the writing or drawing surface, so the trailing portion of the writing tube moves upwardly and opposite to the direction of the guide surface. Thus, the front end of the writing tube tip is slightly inclined in relation to the writing or drawing surface, so that a rearwardly opening, wedge-shaped gap is created between the front surface of the writing tube tip and the writing or drawing surface. Through this gap, writing fluid better can exit the front end surface of the writing tube tip and onto the writing or drawing surface, and it becomes possible to attain a markedly higher drawing speed.

German patent application P 37 14 757.9 illustrates a holder for a drawing pen that is movable by a drawing apparatus controlled in respect to a drawing surface. The holder is designed in such a way that during use the drawing pen laterally pivots against an elastic force and forms a gap between the front end of the drawing pen and the writing or drawing surface, so that a higher drawing speed is made possible. However, this reference is directed to designing a holder for a drawing pen, and not to designing a writing tube tip.

It is also already known to support ball point cartridges so a front end is pivotable in all directions against spring pressure order to thereby improve the writing ease for the user. (See e.g., German published application DE-AS 1 203 641, and German Utility Model, DE-GM 85 19 712). However, a pivotable disposition of a writing cartridge would not improve the flow of the writing fluid, nor have any effect on writing speed. Additionally, those constructions structurally are different from that of the tube pen according to the invention. In such ball point pens, either a ball point cartridge has a deformable section that constitutes the pivot area (DE-GM 85 19 712) or the cartridge axially is supported in a customary support mechanism and pivoting of a ball point cartridge is made possible by tolerances within the support mechanism (DE-AS 1 203 641).

A tube pen and writing tube tip according to the present invention may be defined by a resilient means that comprises a bushing made of an elastic material clamping fixed in the pen body in the area of the point around which the writing tube is pivotable.

With such a construction it is possible to first push a bushing of an elastic material, such as natural rubber or plastic, onto the tube pen so that it is firmly seated. The writing tube with bushing fixed thereon can be inserted into the pen body from the front, so that the bushing is in firm contact with the inner wall of a corresponding recess in the pen body and the rear end of the writing tube abuts against a guide surface in the pen body. In this manner, the writing tube is maintained pivotable in all directions around a point located on the center axis of the writing tube, in the area of the bushing. The bushing, because of its elastic design, creates a restoring elastic force when the tube pen is laterally displaced. The contact of the bushing with the tube pen as well as with the pen body secures the tube pen against sliding out of the pen body.

In order to further assure against a sliding out, or pulling of the tube pen from the pen body and in order to lend additional strength in the area of the pen body front end, which customarily is made of plastic, a cup element made of metal may be seated on the front end of the pen body. The cup may have a bottom with a center opening disposed coaxially with the center axis of the unpivoted tube pen, through which the tube pen tip extends. The diameter of the opening in the cup is larger than the outside diameter of the tube pen and smaller than the outside diameter of the bushing.

The metal cup element lends additional strength to the front end of the tube pen. The bottom of the cup element and the size of the center opening prevents pulling of the tube pen and bushing, out of the pen body. Additionally, the center opening in the bottom of the cup element may also serve to limit the pivot movement of the writing tube around a pivot point, located on its center axis.

In order to impart further strength to the writing tube and to prevent the occurrence of deformations or other damage to the rear end of the writing tube upon an axial load, the writing tube may have an enlarged diameter area on its rear end that is provided with a support surface to cooperate with a guide surface provided within the pen body.

The writing tube enlarged diameter area is selected such that a support surface of sufficient dimensions is attained. In particular, for tube pens of very narrow line widths, this enlarged diameter area may comprise a separately made part that sits on the rear end of the writing tube and is fixedly connected with the tube, prior to assembling the tube pen tip.

Preferably, the support surface at the rear end of the writing tube comprises an annular surface with a convex arch. The guide surface in the pen body may be an annular surface with a concave arch. However, it is also possible to shape the pen body guide surface in the form of a truncated cone, for example.

The invention is described in detail below by means of the drawing FIGURE, showing a tube pen in a partial view and partially in section.

BRIEF DESCRIPTION OF THE DRAWING

The drawing FIGURE shows a schematic side view, partially in cross-section, of an embodiment of the present invention.

DESCRIPTION OF THE PREFERRED EMBODIMENT

The tube pen shown may have a basic structure that corresponds to that illustrated by German published application, DE-OS 30 09 169. A pen body 1 is formed with an inner bore (not shown) in which a drop weight, (not shown), is disposed to move back and forth axially, within defined limits. A cleaning wire 2 is fastened to the front of the drop weight and extends into writing tube 3, which is fastened in the front end of the pen body 1, in a manner described hereinafter.

As illustrated, a sleeve element 12 surrounds the pen body 1. Between the sleeve and the pen body 1 there is disposed, in a known manner, a writing fluid compensation chamber, (not shown). A writing fluid supply chamber in the shape of a tubular component closed at the end is, also in a known manner, seated from behind onto the pen body 1. The writing fluid component is surrounded by a barrel 13 which is removably fastened on the rear end of the sleeve element 12.

As shown in section by the drawing, a cavity 6 in the front end of the pen body 1 opens toward the front end and extends coaxially with the axis 11. Hence, a connection to the inner bore is formed in the center of the cavity bottom, through which extends the cleaning wire 2 on the one hand and through which, on the other hand, writing fluid can flow to the writing tube 3.

In contrast to the customary rigid fastening of a writing tube in the front end of the pen body, the writing tube 3 is pivotably disposed in the pen body 1 around a point on the axis 11 which constitutes the center axis of the writing tube 3. For this purpose the writing tube 3 has, on its rear end, an area 7 of enlarged diameter, the rear outer edge of which is rounded in such a way that a convex arch surface results. This support surface, used to prevent axial displacement of the writing tube 3 into the interior of the pen body 1, abuts a guide surface 6 formed in the bottom of a recess 4, in the pen body 1, and has the shape of a convex arch annular surface located concentrically to the axis 11.

A bushing 5 made of an elastic material is placed on the writing tube 3 in such a way that it generally cannot be displaced in an axial direction. This bushing 5 is, together with the writing tube 3, inserted into the recess 4 in such a way that the support surface formed by the area 7 of the writing tube 3 abuts the guide surface 6 of the pen body 1. The bushing 5 also is in clamping contact with the inside diameter surface of the recess 4 of the pen body 1, i.e., the tube pen 3 is supported in the pen body 1 so that it is generally not displaceable in an axial direction.

After this installation, a cup element 8, 9 made of metal is placed on the front end of the pen body 1 and glued on the pen body 1, if required. The cup has in the center area of its bottom 9 an opening 10 located coaxially to the axis 11 after installation, through which the writing tube 3 extends. The diameter of the center opening 10 in the cup element is selected such that it is smaller than the outside diameter of the bushing 5, to prevent unintended removal of the writing tube 3 from the pen body 1. Of course the diameter of the center opening 10 is larger than the outside diameter of the writing tube 3.

As can be noted, the writing tube 3 can be pivoted around a point located on the axis 11 in the area of the bushing 5 by forces acting on its front end, e.g., frictional forces because of placement of the front end of the tube pen 3 on a drawing surface with a corresponding movement of the tube pen tip and elastic deformation of the bushing 5. During this pivot movement the trailing end 7 of the tube pen 3 tends to be displaced away from the drawing surface, and the support surface formed by the enlarged area 7 will slide along the concave guide surface 6 of the pen body 1.

A lateral pivot movement of the writing tube 3 is possible in all directions because of the centrosymmetrical design in respect to the axis 11, and is limited in the extreme case by the placement of the writing tube 3 against the adjacent edge area of the center opening 10. However, by an appropriate choice of characteristics for the material of the bushing 5, the displacement of the tube pen 3 from its position coaxial to the axis 11 usually is so small that this extreme position is not attained during normal use.

As previously explained, the pivot movement of the writing tube 3 during operation results in the formation of a wedge-like gap between the writing or drawing surface and the front end surface of the writing tube 3, so that even with a large drawing speed a sufficient amount of writing fluid can be applied to the writing or drawing surface.

While a preferred embodiment of the invention has been shown and described, the invention is to be limited solely by the scope of the appended claims.

We claim:

1. In a tubular writing pen of the type having a pen body (1) comprising a writing tube (3) adapted to permit ink to flow therethrough and a drop weight body, whereby a front section of the writing tube has a cleaning wire (2) extending from said drop weight body and along a center axis (11) and into the writing tube (3), the improvement which comprises a writing tube (3) clamped against a resilient pressure means and pivotable in a limited way in all directions around a point located on said center axis (11) and inside the pen body (1), wherein further a writing tube (3) rear end has means to movably brace said writing tube against axial displacement through sliding contact with a guide surface (6) that is provided centrosymmetrically in the pen body (1) and about said center axis (11) of the unpivoted writing tube (3).

2. An improved tubular writing pen in accordance with claim 1, characterized in that the writing tube (3) is clamped within a front end of the pen body (1) means of a resilient means that comprises a bushing (5) made of an elastic material.

3. An improved tubular writing pen in accordance with claim 2, characterized in that a cup element (8, 9) made of metal is seated on the front end of the pen body (1), and comprises a bottom (9) with a center opening (10) disposed coaxially with the center axis (11) of an unpivoted writing tube (3), and through which the writing tube (3) extends, wherein the diameter of the center opening is larger than the outside diameter of the writing tube (3) and smaller than the outside diameter of the bushing (5).

4. An improved tubular writing pen tip according to claim 1, characterized in that the writing tube (3) rear end comprises an area (7) with an enlarged diameter so as to form a support surface that is in contact with the guide surface (6) that is provided in the pen body (1).

5. An improved tubular writing pen according to claim 4, characterized in that the support surface is an annular surface with a convex arch.

6. An improved tubular writing pen according to claim 1, characterized in that the guide surface (6) is an arch with a concave surface.

7. An improved tubular writing pen tip according to claim 2, characterized in that the writing tube (3) rear end comprises an area (7) with an enlarged diameter so as to form a support surface that is in contact with the guide surface (6) that is provided in the pen body (1).

8. An improved tubular writing pen according to claim 7, characterized in that the support surface is an annular surface with a convex arch.

9. An improved tubular writing pen tip according to claim 3, characterized in that the writing tube (3) rear end comprises an area (7) with an enlarged diameter so as to form a support surface that is in contact with the guide surface (6) that is provided in the pen body (1).

10. An improved tubular writing pen according to claim 9, characterized in that the support surface is an annular surface with a convex arch.

11. An improved tubular writing pen according to claim 2, characterized in that the guide surface (6) is an arch with a concave surface.

12. An improved tubular writing pen according to claim 3, characterized in that the guide surface (6) is an arch with a concave surface.

13. An improved tubular writing pen according to claim 4, characterized in that the guide surface (6) is an arch with a concave surface.

* * * * *